United States Patent
Bradshaw

(10) Patent No.: US 6,602,376 B1
(45) Date of Patent: *Aug. 5, 2003

(54) MASTER PROCESSING APPARATUS

(75) Inventor: Franklin C. Bradshaw, Scottsdale, AZ (US)

(73) Assignee: Xyron Inc., Scottsdale, AZ (US)

( * ) Notice: Subject to any disclaimer, the term of this patent is extended or adjusted under 35 U.S.C. 154(b) by 128 days.

This patent is subject to a terminal disclaimer.

(21) Appl. No.: 09/874,369

(22) Filed: Jun. 6, 2001

Related U.S. Application Data

(63) Continuation of application No. 09/301,563, filed on Apr. 29, 1999, now Pat. No. 6,270,612, which is a continuation of application No. 08/989,513, filed on Dec. 12, 1997, now Pat. No. 5,961,779, which is a continuation of application No. 08/748,982, filed on Nov. 14, 1996, now Pat. No. 5,735,998, which is a continuation of application No. 08/354,222, filed on Dec. 12, 1994, now Pat. No. 5,580,417, which is a continuation-in-part of application No. 08/247,003, filed on May 20, 1994, now Pat. No. 5,584,962.

(51) Int. Cl.[7] .............................................. B32B 31/00
(52) U.S. Cl. ...................... 156/234; 156/238; 156/522; 156/555
(58) Field of Search ................................. 156/230, 234, 156/238, 247, 249, 250, 269, 510, 522, 540, 541, 542, 555, 582

(56) References Cited

U.S. PATENT DOCUMENTS

| | | |
|---|---|---|
| 2,647,299 A | 8/1953 | Thomas |
| 3,027,285 A | 3/1962 | Eisner et al. |
| 3,309,983 A | 3/1967 | Dresser |
| 3,737,359 A | 6/1973 | Levitan |
| 3,799,829 A | 3/1974 | Heatwole |
| 3,901,758 A | 8/1975 | Humphries |
| 3,944,455 A | 3/1976 | French |
| 4,090,911 A | 5/1978 | Shaffer |
| 4,151,900 A | 5/1979 | Kirwan |
| 4,295,921 A | 10/1981 | Bopst, III |
| 4,387,000 A | 6/1983 | Tancredi |
| 4,425,182 A | 1/1984 | Jones |
| 4,564,411 A | 1/1986 | Holzer |
| 4,619,728 A | 10/1986 | Brink |
| 4,625,931 A | 12/1986 | Tamura et al. |
| 5,139,600 A | 8/1992 | Singer |
| 5,163,349 A | 11/1992 | Takagi et al. |
| 5,279,697 A | 1/1994 | Peterson et al. |
| 5,295,753 A | 3/1994 | Godo |
| 5,480,509 A | 1/1996 | Matsuo |

(List continued on next page.)

FOREIGN PATENT DOCUMENTS

| | | |
|---|---|---|
| DE | 3030179 A1 | 3/1982 |
| GB | 1189956 | 4/1970 |
| GB | 1280015 | 7/1972 |
| GB | 2126389 A | 3/1984 |
| GB | 2199010 A | 6/1988 |
| GB | 2230250 A | 10/1990 |

*Primary Examiner*—James Sells
(74) *Attorney, Agent, or Firm*—Pillsbury Winthrop LLP

(57) ABSTRACT

A multi-purpose laminating and adhesive transfer apparatus having a frame supporting rotatably engaging nip rollers. A replaceable cartridge is insertable into the frame and has upper and lower feed rolls which may be a laminate, film or paper, or an adhesively coated film or a film having an affinity for adhesive. The upper and lower feed rolls containing the webs of laminating or adhesive transfer material have tensioning caps which can be adjusted to provide the proper tensioning to prevent the rollers from overrunning as they rotate. Tensioning caps and the cartridges are pre-set and provided to the user. A cutter blade is positioned at the discharge side of the nip rollers and may be actuated to sever the master at any desired location. The apparatus may be operated to apply lamination to either top or bottom surfaces of a substrate or an adhesive to the top or bottom surface of the substrate or to both surfaces.

42 Claims, 3 Drawing Sheets

U.S. PATENT DOCUMENTS

| | | | |
|---|---|---|---|
| 5,580,417 A | * 12/1996 | Bradshaw | 156/495 |
| 5,584,962 A | 12/1996 | Bradshaw et al. | |
| 5,735,998 A | * 4/1998 | Bradshaw | 156/495 |
| 5,788,796 A | 8/1998 | Look et al. | |
| 5,788,806 A | 8/1998 | Bradshaw et al. | |
| 5,961,779 A | * 10/1999 | Bradshaw | 156/495 |
| 6,270,612 B1 | * 8/2001 | Bradshaw | 156/234 |

* cited by examiner

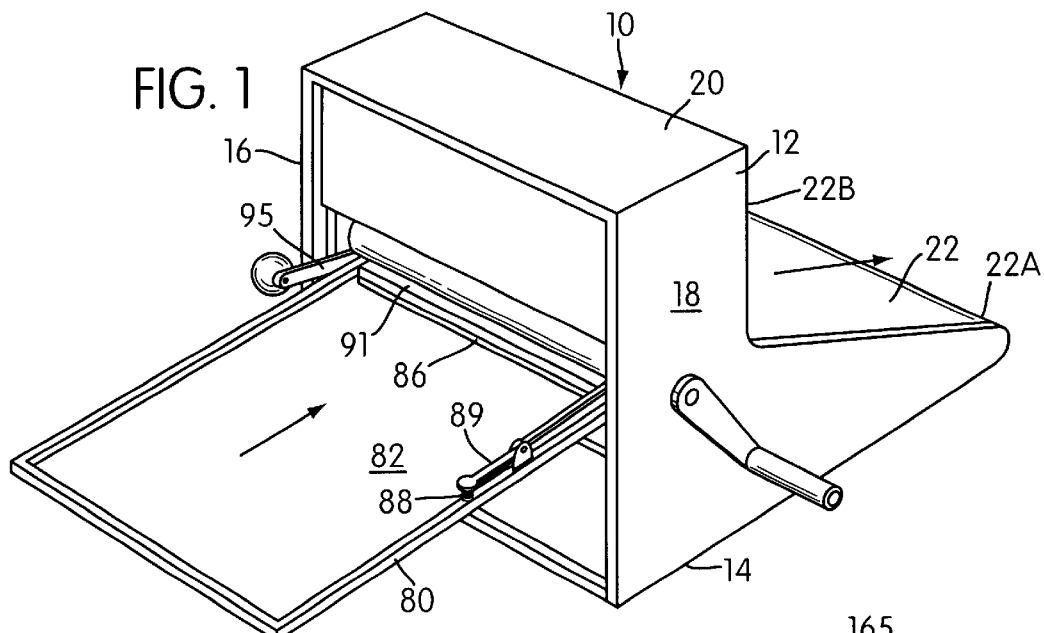
FIG. 1
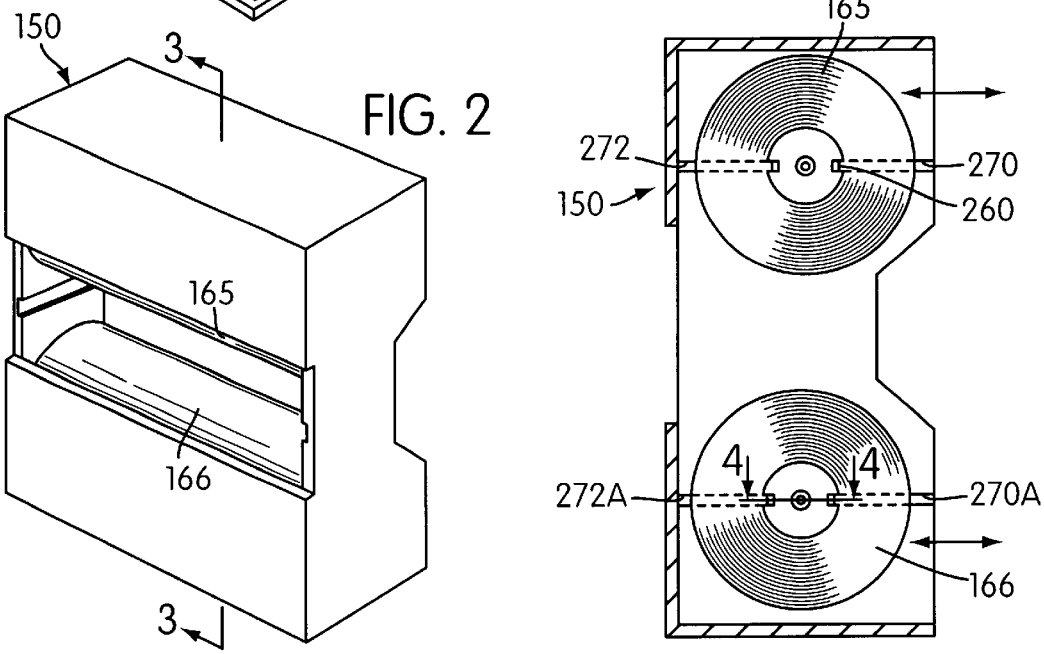
FIG. 2
FIG. 3
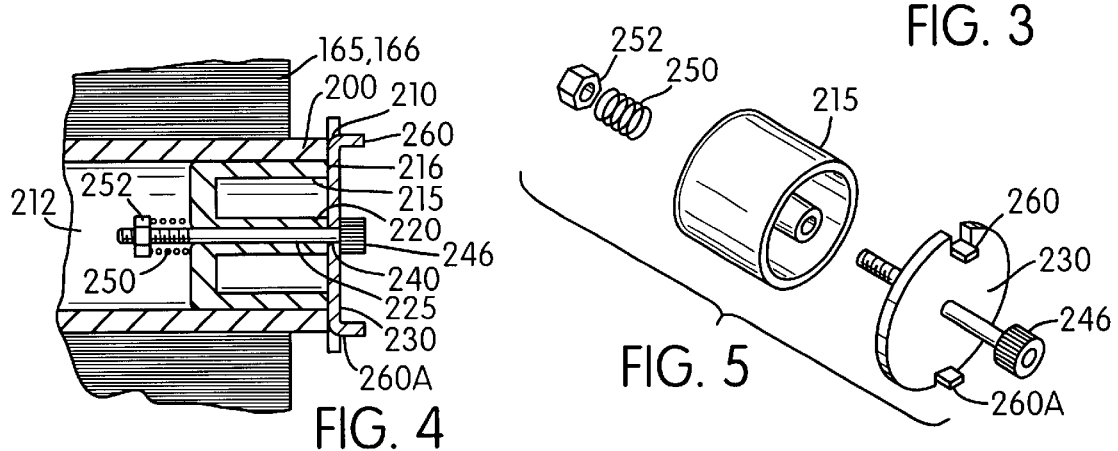
FIG. 4
FIG. 5

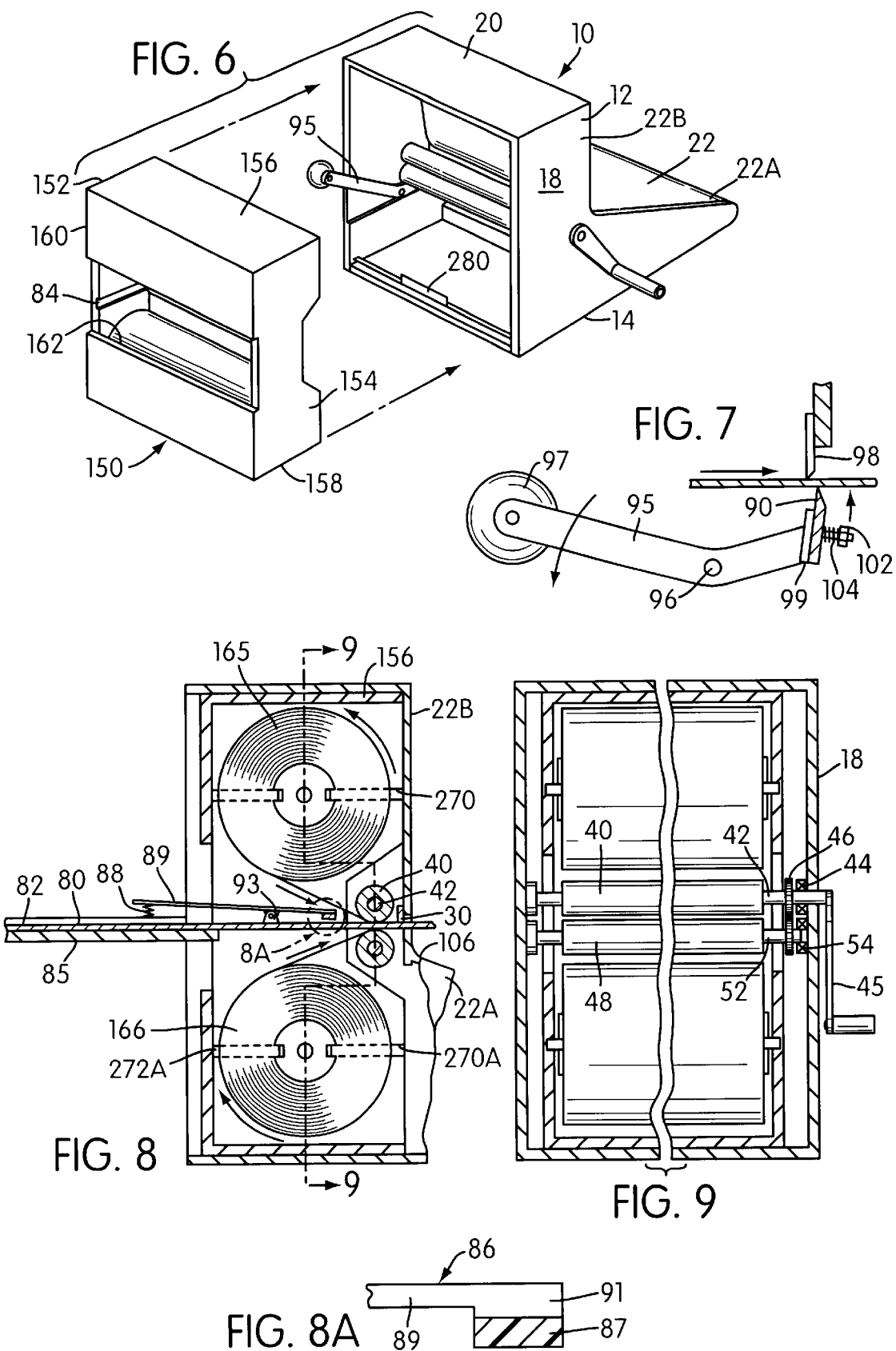

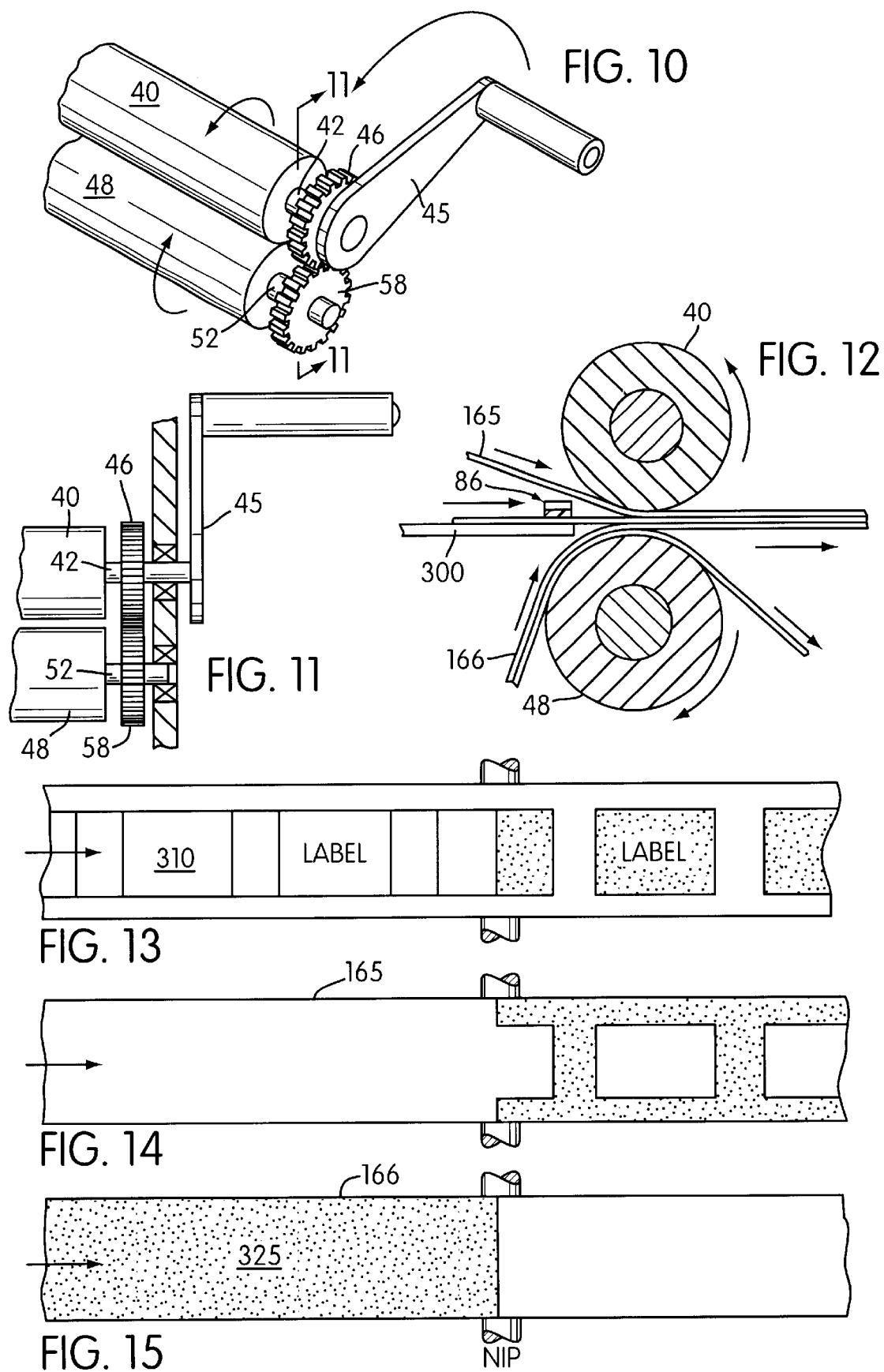

MASTER PROCESSING APPARATUS

The present application claims priority from and is a continuation of U.S. patent application of Bradshaw, Ser. No. 09/301,563, filed Apr. 29, 1999, U.S. Pat. No. 6,270,612 which is a continuation of and claims priority from U.S. patent application of Bradshaw, Ser. No. 08/989,513, filed Dec. 12, 1997, U.S. Pat. No. 5,961,779 which is a continuation of and claims priority from U.S. patent application of Bradshaw, Ser. No. 08/748,982 filed Nov. 14, 1996 U.S. Pat. No. 5,735,998 which is a continuation of and claims priority from U.S. patent application of Bradshaw, Ser. No. 08/354,222 filed Dec. 12, 1994 U.S. Pat. No. 5,580,417, which is a continuation-in-part of and claims priority from U.S. patent application of Bradshaw et al., Ser. No. 08/247,003 filed May 20, 1994 (U.S. Pat. No. 5,584,962) which is the subject of U.S. Reissue application Ser. Nos. 09/213,876 filed Dec. 17, 1998 now U.S. Pat. No. RE 37,345 and 09/664,794, filed Sep. 19, 2000.

FIELD OF THE INVENTION

The present invention relates to an apparatus for laminating items and which apparatus will also transfer adhesives to substrates for purposes of producing articles such as labels and stickers.

BACKGROUND OF THE INVENTION

It is common practice to protect documents and other items such as cards by encasing them in clear plastic coverings. Various products known as protectors are available for this purpose. Another common way of protecting documents and similar items is to laminate them. Lamination involves sealing the document or item between oppositely applied transparent films and lamination is commonly applied to such items as driver's licenses, identification cards membership cards and the like.

Another operation that is often applied to documents and papers is that of adhesive transfer. Adhesive transfer is an operation that is used to make articles such as labels and stickers. One manner of producing such labels is to print the labels on blanks provided for this purpose. The blanks generally have an adhesive backing and are secured to a liner from which they may be peeled at the time of use. Computer systems are available that have the capability of printing labels on liner label stock provided for this purpose. This manner of making labels or stickers is expensive and further is limiting in that the printed material must be adapted to the physical size or confines of the label or sticker carried on the liner. This limits the information and creativity that may be incorporated in label making.

In conventional apparatuses, the supply rolls are individually mounted to the apparatus frame. At times, this can result in the user matching up supply rolls incorrectly, which may cause problems during the master processing operation, including requiring removal and replacement of one or both rolls. Also, it is simply inconvenient for the user to match up two supply rolls and individually mount them to the apparatus frame.

SUMMARY OF THE INVENTION

The present invention provides a master processing apparatus for processing a master. The apparatus comprises a frame, a master processing assembly, and a feed roll carrier with first and second feed rolls carried on the carrier. The first and second feed rolls carry respective supplies of first and second stock material at least one of which has a layer of adhesive disposed thereon. The feed roll carrier holds the feed rolls together to enable the first and second feed rolls to be removably mounted together to the frame for unwinding and feeding of the stock materials into the master processing assembly. The master processing assembly is constructed and arranged to perform a master processing operation wherein the processing assembly causes adhesive bonding between the first and second stock materials and the master being fed therein and then subsequently discharges the processed master and stock materials.

BRIEF DESCRIPTION OF THE DRAWINGS

The above and other objects, advantages and features of the present invention will be more fully understood from the following description, claims and drawings in which:

FIG. 1 is a perspective view of the transfer apparatus of the present invention;

FIG. 2 is a perspective view of the supply roll containing a cartridge removed from the apparatus;

FIG. 3 is a sectional view taken along line 3—3 of FIG. 2;

FIG. 4 is a sectional view taken along line 4—4 of FIG. 3;

FIG. 5 is an exploded view of the tensioning cap associated with the supply rolls;

FIG. 6 is a perspective view illustrating the installation of a cartridge;

FIG. 7 is a detail view of the cutter mechanism;

FIG. 8 is a side view, partly in section, showing the cartridge in place and a master being fed into the device;

FIG. 8A is a detail view of the wiper as indicated in FIG. 8;

FIG. 9 is a sectional view taken along line 9—9 of FIG. 8:

FIG. 10 is a detail view of the nip rollers;

FIG. 11 is a sectional view taken alone line 11—11 of FIG. 10;

FIG. 12 is a side view showing a master being fed between the nip rollers

FIG. 13 shows labels as they receive adhesive;

FIG. 14 is a plan view of the upper feed web showing the pick up of excessive adhesive thereon; and FIG. 15 illustrates removal of the adhesive from the lower web.

Turning now to the drawings, particularly FIGS. 1 to 11, the transfer apparatus of the present invention is generally designated by the numeral 10 and includes a housing member generally designated by the numeral 12 having a base 14, opposite side walls 16 and 18, a top 20 and a rear wall 22. The rear wall 22 of the housing is upwardly and forwardly inclined at panel 22A from the base 14 to a location where the rear wall extends vertically at panel 22B. As seen in FIG. 8, an opening 30 is defined between the panels 22A and 22B through which the substrate and processed articles are discharged.

As best seen in FIGS. 8, 9 and 10, an upper nip roller 40 extends transversely between the side walls of the frame spaced rearwardly from the edge of the side walls. The upper nip roller includes an axial shaft 42 rotatable in suitable bearings or bushings 44 at opposite ends. The shaft is covered by a cylindrical roller member 43 of resilient material such as rubber. Shaft 42 extends exteriorly of the side plate and is shown carrying a hand crank 45 for manually rotating the roller and shaft. Alternatively, the rollers may be powered by an electrical motor, not shown. A pinion gear 46 is secured to one end of the shaft adjacent the interior surfaces of the side wall.

A second nip roller 48 extends transversely between the side walls 16 and 18 positioned parallel to the upper nip roller. The lower nip roller may be vertically aligned with the upper nip roller but preferably is forwardly displaced a distance forward of the upper nip roller, as for example approximately ¼" as best seen in FIG. 8. The terms "forward " and "rearward "or "front " and "rear " as used herein, refer to the orientation of the feed path through the device. The lower nip roller has a shaft 52 which is rotatable in bearings 54 located at the interior of the opposite side walls. A pinion gear 58 is mounted at one end of the shaft 52. Pinion gear 58 engages the pinion gear 46 on the upper nip shaft so that actuation of the upper nip roller by means of the crank 45 or other power means will impart opposite rotation to both nip rollers as indicated by the arrows in FIG. 10.

Feed tray 80 has or a planar feeding surface 82 with opposite extending flanges 85 which flanges are removable insertable in horizontal recesses 84 of the cartridge 100. A wiper assembly 86 is mounted on the upper surface of the feed tray as seen in FIGS. 8 and 8A. The wiper has a bar 91 which extends transversely across the tray adjacent the entrance to the nip area. The bar has a pad 87 of felt or resilient or soft material such as felt, soft plastics, fabric or rubber, Which lightly engages the master as it passes between the wiper and the tray surface. The wiper series several functions and cleans, smooths and guides the master as it enters the nip between the rollers. A particularly important function of the wiper is to tension the master substrate keeping it flat and aligned with the laminate and adhesive webs resulting in better alignment especially when feeding sheets intermittently. The wiper has an arm 89 which is upwardly biased by spring 88. Arm 89 is pivotally attached to the edge of the tray at fulcrum 93 so that the wiper is pressed into light engagement with the material passing beneath the pad 87. The wiper bar 91 may be lifted to facilitate loading a master by manually depressing the outer end of the arm 89 against the force of spring 88. Preferably the pad is replaceable as required.

Referring to FIGS. 6 and 7, a blade 90 having a cutting edge extends transversely adjacent the discharge opening. The blade is movable vertically upward from a non-actuated position to a cutting position by means of lever 95 to which the bar 90 is attached. Lever 95 is pivotally secured to the interior of the housing side wall at pivot rod 96. Downward movement of the lever at handle 97 will move the blade 90 upward into engagement with anvil bar 98 which is fixed and extends transversely. Preferably, the blade 90 is mounted on a carrier 99 by means of pins 102 having compression springs 104 thereon which bias the blade toward the cutting bar. Thus, when the cutting action occurs, the flat surface of the blade moves along the anvil which provides a self-cleaning action. The upper end of panel 22A is slightly curved at 106 as seen in FIG. 8 to facilitate smooth discharge of the item being processed. The area indicated by the numeral 106 may be coated with a suitable low-frictional material such as that sold under the trademark "Teflon".

A primary advantage of the present invention is that various substrates may be provided to the user in a self-contained, ready-to-use cartridge which allows the user simply to select and insert the appropriate cartridge. As indicated above, the device of the present invention can be used for multiple purposes for adhesive transfer and lamination. Adhesive can be transferred to either surface of the master and may be a dry adhesive. The cartridge is generally designated by the numeral 150 and includes a frame having opposite side walls 152, 154, a top 156, and bottom 153. A front wall 160 defines a substantial rectangular opening 162. As shown, the cartridge includes an upper feed roll 165 and a lower feed roll 166 each containing a web of film or other flexible substrate material. A significant advantage of the present invention is that the upper and lower feed rolls are provided to the user pre-wound and properly tensioned so as not to overrun during operation and to provide proper tracking. The proper tensioning of the feed rolls is accomplished by means of a tensioning device as best seen in FIGS. 3, 4 and 5.

In FIGS. 3, 4 and 5, which figures are representative of the construction of the both ends of both feed rolls, the substrate material is shown wound about the feed roll core 200. The core 200 is a cylinder of cardboard or plastic having an end face 210. Core 200 has a hollow interior 212 which receives an end cap 215. The cap may be molded of plastic or other similar material having an interior outer wall 216. A boss 220 is concentrically formed in the cap with respect to the cylinder wall 216. Boss 220 defines an axial bore 225. The cap 215 is positioned slightly inwardly of the end of the core and may be adhesively secured to the interior wall 212 of the roll core 200.

A circular end plate 230 abuts the end of the core which plate has a diameter slightly greater than the diameter of the core. The end plate has a central aperture 240 which receives the threaded shaft of bolt 246. A spring 250 is interposed between the head of the bolt and the interior face of the cap 215. Nut 252 engages the threaded end of the bolt. The head of the bolt 246 bears against the exposed surface of the end plate 230 and the position of the nut along the shaft of the bolt determines the frictional resistance that exists between the interior surface of the end plate 230 and the end face of the core of the roller. This tension is pre-adjusted by the manufacturer to provide the proper roll tension depending upon the type of material on the roll, the size of the material, the thickness of the material and other factors. Mounting tabs 260 and 260A project outwardly from the end plate and are slidingly engageable in mounting slots 270, 270A and 272, 272A provided on the interior surfaces of the cartridge side walls.

Thus, it will be seen that inserting a supply of suitable feed substrate is easily accomplished. The user simply selects the appropriate cartridge 150 and positions the cartridge in the opening at the front side of the housing. The cartridge is locked in place in the housing in a vertical position by locking detent members 230. The feed rolls may be various types of stock such as clear laminates. paper or film for removing excessive adhesive or rolls of material having a loose adhesive coating and a release coating on the opposite surface. The feed tray 80 is inserted in a generally horizontal position in the opposite slots in the cartridge.

As mentioned above, the device may be used as a lamination device or as an adhesive transfer device. In the case of use as an adhesive transfer device, the lower feed roll which consists of a film carrying an easily transferable adhesive. The upper feed roll would typically be a web of flexible carrier material having release characteristics on a lower surface and adhesive coating on the other surface. With rolls of this type in position, the end of the web of the lower feed roll is extended over the lower nip roller. The upper feed roll, in the case of adhesive transfer, will consist of a web of material such as inexpensive paper or aim, having an affinity for adhesive. The end of the web is extended between the nip rollers with the end of the web adhesively secured to the web of the master in the lower roll.

Referring to FIGS. 11 to 15, the master which is designated by the numeral 300 consists of a continuous sheet of material having an upper surface and a lower surface. The upper surface carries labels 310 which have been pre-printed. Obviously, the master can be any pre-printed document or series of documents which can be generated by the user, as for example on a computer. The labels 310 car be of varying size and shape and it is understood that the term "labels" as used herein is intended to be representative of printed materials of various types arranged on a flexible substrate.

The master is aligned on the feed tray with the leading free edge of the master positioned on the exposed adhesive surface of the lower feed stock material 166 at the nip roller interface. The slight forward protrusion of the lower nip roller 48 facilitates securing the master at this location. The web 165 of the upper feed roller is fed from the cartridge to the nip roller interface on the upper side of master 300.

The operator then actuates the machine by operating the crank which will rotate the upper nip roller and by means of the inter-engaging pinion gears, cause rotation of the lower nip roller. The rotation will also advance the upper web, the lower web and the master. The master is smoothed, guided and wiped clean as it passes between the wiper 86 and the upper surface of the tray. As the master proceeds between the nip rollers in the interface nip area, the exposed adhesive 325 from the lower web will be transferred to the lower surface of the master 300. The upper web 165 will pick up any excessive adhesive not transferred to the master, as for example adhesive in the areas outside the perimeter of the label areas 310. The upper web should be wider than the adhesive web. The master may then be easily severed into individual labels or strips of labels by operating the cutter by means of the lever as the master emerges from the discharge opening at the rear of the machine.

Note that the master can be oriented with either printing or indicia facing upwardly or downwardly depending on the user's requirements.

For example, if the user is making labels which are to be applied to the inside of a window, the master would, in most cases, be fed into the applicator with the printing disposed downwardly so adhesive would be applied over the printed area 310. The apparatus can apply lamination to either top or bottom surfaces of a substrate or adhesive to the top or bottom surfaces of a substrate or to both surfaces. The device can also perform combination operations in applying of both the laminate and an adhesive to a substrate, the operation being determined by the selection of the cartridge and feed rolls within the cartridge that are inserted into the apparatus.

The characteristics of the lower web are such that the adhesive is a nonaggressive adhesive loosely adhered to the surface of the web. Thus, the lower web serves as a peelable cover which can be stripped away at the time the master is to be used by adhesively applying the master to a surface.

One significant advantage of the present invention is that the upper and lower feed rolls may be provided to the user pre-wound and properly tensioned so as not to overrun during operation. The proper tensioning is pre-set by the tensioning device described above.

While the principles of the invention have been made clear in the illustrative embodiments set forth above, it will be obvious to those skilled in the art to slake various modifications to the structure, arrangement, proportion, elements, materials and components used in the practice of the invention. To the extent these various modifications do not depart from the spirit and scope of the appended claims, they are intended to be encompassed therein.

I claim:

1. A master processing apparatus for processing a master, said apparatus comprising:
    a frame;
    a master processing assembly; and
    a feed roll carrier and first and second feed rolls carried on said carrier, said first and second feed rolls carrying respective supplies of first and second stock material at least one of which has a layer of adhesive disposed thereon, said feed roll carrier holding said feed rolls together to enable said first and second feed rolls to be removably mounted together to said frame for unwinding and feeding of said stock materials into said master processing assembly;
    said master processing assembly being constructed and arranged to perform a master processing operation wherein said processing assembly causes adhesive bonding between the first and second stock materials and the master being fed therein and then subsequently discharges the processed master and stock materials.

2. A master processing apparatus according to claim 1, further comprising an actuator constructed and arranged to affect operation of said master processing operation so as to perform said master processing operation.

3. A master processing apparatus according to claim 1, wherein said feed roll carrier is a cartridge comprising a cartridge body structure constructed and arranged to be mounted to said frame to enable mounting of said feed rolls to said frame, said feed rolls being removably mounted to said cartridge body structure and said cartridge body structure being configured to be removed from said frame to remove said feed rolls for replacement thereof.

4. A master processing apparatus according to claim 3, wherein said cartridge body structure has a master feeding opening which is positioned and configured to allow the master to be inserted through said opening between said feed rolls.

5. A master processing apparatus according to claim 1, wherein said adhesive layer is formed from pressure-sensitive adhesive and wherein said master processing assembly is constructed and arranged to perform the master processing operation without the use of heat transfer by applying pressure to said stock materials and the master fed therein.

6. A master processing apparatus according to claim 1, wherein said adhesive layer is formed from pressure-sensitive adhesive and wherein said master processing assembly includes first and second cooperating structures which are constructed and arranged to apply pressure to the master and stock materials fed therein so as to cause said adhesive bonding and perform said master processing operation without the use of heat transfer.

7. A master processing apparatus according to claim 6, wherein said first and second cooperating structures are a pair of nip rollers.

8. A master processing apparatus according to claim 1, further comprising a blade constructed and arranged to sever the processed master and stock materials.

9. A master processing apparatus according to claim 8, wherein said blade is constructed and arranged to sever the processed master and stock materials transversely with respect to the direction in which they are fed.

10. A master processing apparatus according to claim 1, further comprising a feed tray mounted to said frame, said feed tray being constructed and arranged to support and guide the master as it is being fed towards said master processing assembly.

11. A master processing apparatus according to claim 1, wherein said master processing apparatus is a laminating apparatus and wherein said first and second stock materials are laminating films each coated with an adhesive layer.

12. A master processing apparatus according to claim 1, wherein said master processing apparatus is an adhesive transfer apparatus and wherein said first stock material is a release liner coated with said adhesive layer in the form of a pressure-sensitive adhesive and said second stock material is an adhesive mask for covering said master and said adhesive layer during said master processing operation.

13. A master processing apparatus according to claim 1, wherein said apparatus is a combination laminating and adhesive transfer apparatus.

14. A master processing apparatus to be used in conjunction with a feed roll carrier and first and second feed rolls held together on said carrier, said first and second feed rolls carrying respective supplies of first and second stock materials at least one of which has a layer of adhesive disposed thereon, said apparatus comprising:

a frame constructed and arranged to enable said feed roll carrier to removably mount said first and second feed rolls together to said frame for unwinding of said first and second stock materials;

a master processing assembly positioned with respect to said frame such that, when said first and second feed rolls are mounted to said frame, the master can be fed into said master processing assembly with said first and second stock materials unwound from their respective feed rolls and disposed on opposing sides of the master;

said master processing assembly being constructed and arranged to perform a master processing operation wherein said processing assembly causes adhesive bonding between the first and second stock materials and the master being fed therein and then subsequently discharges the processed master and stock materials.

15. A master processing apparatus according to claim 14, further comprising an actuator constructed and arranged to affect operation of said master processing operation so as to perform said master processing operation.

16. A master processing apparatus according to claim 14, wherein said feed roll carrier is a cartridge comprising a cartridge body structure having said feed rolls removably mounted thereto, said frame being constructed and arranged to enable said cartridge body structure to be removably mounted thereto to removably mount said feed rolls to said frame, said frame enabling said cartridge body structure to be removed from said frame to remove said feed rolls for replacement thereof.

17. A master processing apparatus according to claim 14, wherein said master processing assembly is constructed and arranged to perform the master processing operation without the use of heat transfer by applying pressure to said stock materials and the master fed therein.

18. A master processing apparatus according to claim 14, wherein said master processing assembly includes first and second cooperating structures which are constructed and arranged to apply pressure to the master and stock materials fed therein so as to cause said adhesive bonding and perform said master processing operation without the use of heat transfer.

19. A master processing apparatus according to claim 18, wherein said first and second cooperating structures are a pair of nip rollers.

20. A master processing apparatus according to claim 14, further comprising a blade constructed and arranged to sever the processed master and stock materials.

21. A master processing apparatus according to claim 20, wherein said blade is constructed and arranged to sever the processed master and stock materials transversely with respect to the direction in which they are fed.

22. A master processing apparatus according to claim 14, further comprising a feed tray mounted to said frame, said feed tray being constructed and arranged to support and guide the master as it is being fed towards said master processing assembly.

23. A feed roll assembly for use in conjunction with a master processing apparatus, said apparatus comprising a frame and a master processing assembly constructed and arranged to perform a master processing operation wherein said processing assembly causes adhesive bonding between substrates fed therein, said feed roll assembly comprising:

a feed roll carrier;

first and second feed rolls carried on said carrier, said first and second feed rolls carrying respective supplies of first and second stock materials at least one of which has a layer of adhesive disposed thereon;

said feed roll carrier holding said feed rolls together to enable said first and second feed rolls to be removably mounted together to said frame for unwinding and feeding of said stock materials into said master processing assembly such that, when said feed rolls are removably mounted to said frame, the master can be inserted into the master processing assembly of the apparatus with said first and second stock materials unwound from their respective feed rolls and disposed on opposing sides of the master, thereby enabling the master processing assembly to perform the aforesaid master processing operation wherein said processing assembly causes adhesive bonding between the first and second stock materials and the master being fed therein and then subsequently discharges the processed master and stock materials.

24. A feed roll assembly according to claim 23, wherein said feed roll carrier is a cartridge comprising a cartridge body structure constructed and arranged to be mounted to said frame to enable mounting of said feed rolls to said frame, said feed rolls being removably mounted to said cartridge body structure and said cartridge body structure being configured to be removed from said frame to remove said feed rolls for replacement thereof.

25. A feed roll assembly according to claim 24, wherein said cartridge body structure has a master feeding opening which is positioned and configured to allow the master to be inserted through said opening between said feed rolls.

26. A feed roll assembly according to claim 23, wherein said adhesive layer is formed from pressure-sensitive adhesive.

27. A feed roll assembly according to claim 23, wherein said first and second stock material are laminating films each coated with a layer of adhesive.

28. A feed roll assembly according to claim 23, wherein said first stock material is a release liner coated with said adhesive layer in the form of a pressure-sensitive adhesive and wherein said second stock material is an adhesive mask for covering said master and said adhesive layer during said master processing operation.

29. A master processing apparatus for processing a master, said apparatus comprising:

a frame;

a pair of nip rollers;

a feed roll carrier and first and second feed rolls carried on said carrier, said first and second feed rolls carrying respective supplies of first and second stock material at least one of which has a layer of adhesive disposed thereon, said feed roll carrier holding said feed rolls together to enable said first and second feed rolls to be removably mounted together to said frame for unwinding and feeding of said stock materials between said nip rollers;

said nip rollers being rotatable to perform a master processing operation wherein said nip rollers cause adhesive bonding between the first and second stock materials and the master being fed therein and then subsequently discharge the processed master and stock materials.

30. A master processing apparatus according to claim 29, further comprising an actuator constructed and arranged to affect rotation of at least one of said nip rollers so as to perform said master processing operation.

31. A master processing apparatus according to claim 30, wherein said feed roll carrier is a cartridge comprising a cartridge body structure constructed and arranged to be mounted to said frame to enable mounting of said feed rolls to said frame, said feed rolls being removably mounted to said cartridge body structure and said cartridge body structure being configured to be removed from said frame to remove said feed rolls for replacement thereof.

32. A master processing apparatus according to claim 31, wherein said cartridge body structure has a master feeding opening which is positioned and configured to allow the master to be inserted through said opening between said feed rolls.

33. A master processing apparatus according to claim 30, wherein said adhesive layer is formed from pressure-sensitive adhesive and wherein said nip rollers perform the master processing operation without the use of heat transfer by only applying pressure to said stock materials and the master fed therein.

34. A master processing apparatus according to claim 30, further comprising a blade constructed and arranged to sever the processed master and stock materials.

35. A master processing apparatus according to claim 34, wherein said blade is constructed and arranged to sever the processed master and stock materials transversely with respect to the direction in which they are fed.

36. A master processing apparatus according to claim 30, further comprising a feed tray mounted to said frame, said feed tray being constructed and arranged to support and guide the master as it is being fed towards said master processing assembly.

37. A master processing apparatus according to claim 30, wherein said master processing apparatus is a laminating apparatus and wherein said first and second stock materials are laminating films each coated with an adhesive layer.

38. A master processing apparatus according to claim 30, wherein said master processing apparatus is an adhesive transfer apparatus and wherein said first stock material is a release liner coated with said adhesive layer in the form of a pressure-sensitive adhesive and said second stock material is an adhesive mask for covering said master and said adhesive layer during said master processing operation.

39. A master processing apparatus according to claim 30, wherein said apparatus is a combination laminating and adhesive transfer apparatus.

40. A method for performing a master processing apparatus, said method comprising:

providing a feed roll assembly comprising:
(i) a feed roll carrier, and
(ii) first and second feed rolls carried on said carrier, said first and second feed rolls carrying respective supplies of first and second stock materials at least one of which has a layer of adhesive disposed thereon;

engaging said feed roll carrier with a frame of a master processing apparatus with said feed roll carrier holding said feed rolls together to removably mount said first and second feed rolls together to said frame for unwinding of said stock materials;

then advancing the master into a master processing assembly of said apparatus with said stock materials being unwound and disposed on opposing sides of said master so as to cause said master processing assembly to affect adhesive bonding between at least said adhesive layer and said master.

41. A method according to claim 40, wherein said master processing operation is affected by operating an actuator connected to said master processing assembly.

42. A method according to claim 40, wherein said feed roll carrier is a cartridge including a cartridge body structure to which said first and second feed rolls are removably mounted and wherein said engaging said feed roll carrier with said frame comprises removably mounting said cartridge body structure to said frame so as to removably mount said feed rolls, said method further comprising removing said cartridge body structure from said frame so as to remove said feed rolls for replacement thereof.

* * * * *